(12) United States Patent  
Lei et al.

(10) Patent No.: US 9,570,036 B2
(45) Date of Patent: Feb. 14, 2017

(54) METHOD AND DEVICE FOR PROCESSING VIDEO IMAGE

(71) Applicant: LEYARD OPTOELECTRONIC CO., LTD., Beijing (CN)

(72) Inventors: Weilin Lei, Beijing (CN); Changjun Lu, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 44 days.

(21) Appl. No.: 14/436,759

(22) PCT Filed: May 22, 2013

(86) PCT No.: PCT/CN2013/076051
§ 371 (c)(1),
(2) Date: Apr. 17, 2015

(87) PCT Pub. No.: WO2014/059791
PCT Pub. Date: Apr. 24, 2014

(65) Prior Publication Data
US 2015/0294640 A1    Oct. 15, 2015

(30) Foreign Application Priority Data
Oct. 18, 2012    (CN) .......................... 2012 1 0397678

(51) Int. Cl.
*G09G 5/00* (2006.01)
*G09G 5/14* (2006.01)
(Continued)

(52) U.S. Cl.
CPC ............ *G09G 5/005* (2013.01); *G09G 3/2096* (2013.01); *G09G 3/32* (2013.01); *G09G 5/00* (2013.01);
(Continued)

(58) Field of Classification Search
CPC ............... G09G 2340/04; G09G 2340/0435; G09G 2340/0442; G09G 5/005; G09G 5/008; G09G 5/14; G09G 5/00; H04N 21/4305; H04N 21/440263
See application file for complete search history.

(56) References Cited

U.S. PATENT DOCUMENTS 6,356,134 B1    3/2002 Clevenger et al.
6,421,092 B1*   7/2002 Yui ............................... 348/511
(Continued)

FOREIGN PATENT DOCUMENTS

CN          1450825 A       10/2003
CN          101547378 A      9/2009
WO          2006/011680 A1   2/2006

*Primary Examiner* — Brian Yenke
(74) *Attorney, Agent, or Firm* — Novick, Kim & Lee, PLLC; Allen Xue; Sang Ho Lee

(57) ABSTRACT

A method and device for processing a video image are provided. The method comprises: receiving an original video image; adjusting a signal clock frequency of the original video image to acquire a processed video image; after a command signal input by a user is received, capturing the processed video image according to a preset size to acquire a video image corresponding to a display window of the preset size; and encoding the video image corresponding to the display window of the preset size to acquire an encoded video image. According to the method and device for processing the video image disclosed by the disclosure, new line, field and blanking synchronization signals are acquired through adjusting the clock frequency of an input image, and then, the corresponding capturing operation and outputting operation are performed according to the image display requirements of the user, so that the effect that video images with any resolution are reliably and stably displayed in the best display area range is realized.

10 Claims, 5 Drawing Sheets

(51) Int. Cl.
    *H04N 21/43*      (2011.01)
    *H04N 21/4402*    (2011.01)
    *H04N 7/01*       (2006.01)
    *H04N 21/2343*    (2011.01)
    *G09G 3/32*       (2016.01)
    *H04N 5/14*       (2006.01)
    *G09G 3/20*       (2006.01)

(52) U.S. Cl.
    CPC ............... *G09G 5/008* (2013.01); *G09G 5/14* (2013.01); *H04N 5/14* (2013.01); *H04N 7/0122* (2013.01); *H04N 21/234309* (2013.01); *H04N 21/4305* (2013.01); *H04N 21/440263* (2013.01); *G09G 2340/04* (2013.01); *G09G 2340/0435* (2013.01); *G09G 2340/0442* (2013.01)

(56)           References Cited

U.S. PATENT DOCUMENTS

| 6,704,009 | B2* | 3/2004 | Tachibana et al. ........... 345/213 |
| 7,087,473 | B2* | 8/2006 | Sorada et al. ............... 438/188 |
| 7,342,588 | B2* | 3/2008 | Lefebvre et al. ............. 345/506 |
| 7,342,838 | B1* | 3/2008 | Sharpe-Geisler et al. .... 365/193 |
| 7,483,058 | B1* | 1/2009 | Frank et al. ................ 348/222.1 |
| 7,940,877 | B1* | 5/2011 | Oh et al. .................... 375/371 |
| 8,218,940 | B2* | 7/2012 | Sultenfuss et al. ........... 386/232 |
| 2002/0015104 | A1* | 2/2002 | Itoh et al. ................... 348/459 |
| 2002/0175924 | A1* | 11/2002 | Yui et al. .................... 345/660 |
| 2005/0013586 | A1* | 1/2005 | Bhatia et al. .................. 386/68 |
| 2005/0254509 | A1* | 11/2005 | Smith et al. ................. 370/429 |
| 2006/0077288 | A1* | 4/2006 | Wu ............................. 348/441 |
| 2006/0114275 | A1* | 6/2006 | Kim et al. ................... 345/698 |
| 2006/0262223 | A1* | 11/2006 | Lee et al. .................... 348/581 |
| 2007/0098302 | A1* | 5/2007 | Yamamoto ................... 382/300 |
| 2008/0198153 | A1* | 8/2008 | Yu et al. ...................... 345/214 |
| 2008/0291326 | A1* | 11/2008 | Shishido et al. ............. 348/555 |
| 2008/0316361 | A1* | 12/2008 | Ito et al. ..................... 348/572 |
| 2009/0086089 | A1* | 4/2009 | Matsui et al. ................ 348/441 |
| 2010/0265344 | A1* | 10/2010 | Velarde et al. .......... 348/208.16 |
| 2011/0187734 | A1* | 8/2011 | Yui ............................. 345/589 |
| 2012/0063534 | A1* | 3/2012 | Lin et al. ..................... 375/295 |
| 2012/0307141 | A1* | 12/2012 | Millet et al. ................. 348/441 |
| 2013/0021352 | A1* | 1/2013 | Wyatt et al. ................. 345/520 |
| 2013/0169863 | A1* | 7/2013 | Smith et al. ................. 348/441 |
| 2014/0085275 | A1* | 3/2014 | Tripathi ...................... 345/204 |
| 2014/0101409 | A1* | 4/2014 | Xu .............................. 711/217 |

* cited by examiner

METHOD AND DEVICE FOR PROCESSING VIDEO IMAGE

TECHNICAL FIELD

The disclosure relates to the image processing field, and in particular to a method and device for processing a video image.

BACKGROUND

At present, a full-colour LED display is widely used for a spliced-type video display, that is, one-piece full-colour LED screen is formed by splicing a series of display modules with a fixed physical resolution. If the resolution of a single display module screen is n*m (that is, a display effective area has n columns of pixels and m lines of pixels), the display resolution of the one-piece full-colour LED screen is K*n columns of pixels and P*m lines of pixels, in the case that the one-piece full-colour LED display screen is formed by splicing K display module screens in a horizontal direction and P display module screens in a longitudinal direction. Moreover, different customers require different screen area, and the number of the spliced display modules of a full-colour LED screen is also unspecified. Therefore, any display area of which the resolution is not less than n*m may be formed. However, the effective resolution of the standard video signal is specified, such as 800*600, 1024*768, 1280*1024, and 1920*1080 or the like. If after a 1080P signal is decoded and decrypted via an HDMI signal, the effective pixel points thereof have 1920 points in the horizontal direction and 1080 points in the longitudinal direction, the video image requires the physical resolution 1920*1080 points of the display device of a terminal for the best display. However, for the display device in which the physical pixel does not reach 1920*1080, the displayed effective area thereof is a part of the image, but the physical pixel points in the full-colour LED display screen are not fixed for site application thereof. Especially, as per the display requirements for the physical points less than 1080P, there are different requirements for the area where the image is displayed, a difference between the video image and the full-colour LED display image is easily caused because the video image cannot be displayed pixel point by pixel point when the full-colour LED display is used for displaying the video image. Furthermore, for a video stream signal of the high resolution, since the pixel clock frequency of the image is too high, the LED display driving circuit suitable for Low Voltage Differential Signalling (LVDS) will suffer from receiving trouble. For example, excessive pixel clock frequency causes excessive transmission bit rate of the LVDS. When the temperature of the circuit rises and the circuit is interfered by noise, the receiving end of the LVDS is unstable, that is, the anti-interference capability becomes bad. Even in a case of a big resolution, such as 1600*1200 resolution, the clock frequency reaches 162.0 Mhz, it cannot be realized to transmit video data through an LVDS protocol.

In order to solve the above problems, in a case where the full-colour LED display displays any resolution, the image is scaled or expanded according to the size of the screen to fit the display of the LED screen. For example, the number of the physical pixel points of the screen is P*K, and the resolution of the image is M*N, so that the image with the resolution of M*N is scaled by P*K. In this way, although a full video screen may be displayed, the processing method increases the complexity of a front-end processing system, and increases the cost, and the image itself will suffer from loss after being processed, which reduces the quality of the image. Furthermore, at present, the technical method of network transmission adopted by the LED limits the data transmission rate of the screen, for example, the transmission rate of a transmission single port of Gbit Ethernet is far less than that in a way of low voltage differential transmission, which is harmful for transmission of high-definition image. Therefore, in order to transmit the high-definition image, multiple Ethernet transmission ports may be added for simultaneous transmission, which also increases the cost.

From the foregoing, in the prior art, the video image is scaled to display video image with different resolutions on the spliced screen, which reduces the quality of the displayed image and makes the processing process complicated.

Currently, no effective solution has been proposed for the problem that the distortion of the displayed image is caused by scaling the video images to display the video images with different resolutions on the spliced screen in the prior art.

SUMMARY

For the problem that the distortion of the displayed image is caused by scaling the video images to display the video images with different resolutions on the spliced screen in the related art, a method and device for processing a video image is provided, by which the above problem is solved.

To this end, according to an aspect of the invention, a method for processing a video image is provided, which includes: receiving an original video image; adjusting a signal clock frequency of the original video image to acquire a processed video image; after a command signal input by a user is received, capturing the processed video image according to a preset size to acquire a video image corresponding to a display window of the preset size; and encoding the video image corresponding to the display window of the preset size to acquire an encoded video image.

Alternatively, the command signal includes a preset abscissa and a preset ordinate, wherein, after the command signal input by the user is received, the step of capturing the processed video image according to the preset size to acquire the video image corresponding to the display window of the preset size includes: performing a pixel point computation according to a first formula to acquire the maximum number Ho of horizontal pixel points of the display window of the preset size, wherein the first formula is:

$$Ho = \frac{Po}{Pi} \times Hit - Hos,$$

wherein the Po is a fixed pixel clock frequency, the Pi is a pixel clock frequency of the original video image, the Hit is the total number of line cycle clocks of the original video image, and the Hos is a spacing of effective pixels between two lines of an output video; capturing the horizontal pixel points with the maximum number of the display window of the preset size according to the preset abscissa to acquire horizontal pixel points of the display window of the preset size; adopting vertical longitudinal points of a resolution of the original video image as vertical longitudinal pixel points of the display window of the preset size; and capturing the processed video image according to the horizontal pixel points and the vertical longitudinal pixel point of the display window of the preset size to acquire the video image corresponding to the display window of the preset size.

Alternatively, the step of adjusting the signal clock frequency of the original video image to acquire the processed video image includes: extracting an original line signal, an original field signal, an original blanking signal and an original blanking masking signal from a control signal of the original video image; performing reset count for the original field signal at jump points of the original field signal by taking the original line signal as a clock to acquire a field synchronization signal; performing reset count for the original line signal at jump points of the original line signal by adopting the fixed pixel clock frequency as a clock to acquire a line synchronization signal; performing reset count for the original blanking signal at jump points which are moments greater than a synchronization head of the line synchronization signal by taking the line synchronization signal as a clock to acquire a blanking synchronization signal; performing reset count for the original blanking masking signal at jump points of the blanking synchronization signal by taking the blanking synchronization signal as a clock to acquire a blanking masking signal; and generating the processed video control signal according to the field synchronization signal, the line synchronization signal, the blanking synchronization signal and the blanking masking signal, and acquiring the processed video image.

Alternatively, after receiving the original video image, the method further includes: receiving the command signal input by the user and parsing the command signal to acquire the preset abscissa and the preset ordinate.

Alternatively, before adjusting the signal clock frequency of the original video image to acquire the processed video image, the method further includes: detecting whether a data signal of the original video image is a DDR signal; and in a case where the data signal of the original video image is the DDR signal, adjusting a bit width of the data signal of the original video image to acquire an original video image of a clock single-edge transmission mode.

Alternatively, after adjusting the signal clock frequency of the original video image to acquire the processed video image, the method further includes: performing a Ping-Pong access operation for on the processed video image by taking the signal clock frequency of the original video image as a storing clock and taking a blanking signal of the processed video image as a storing enable signal.

To this end, according to an aspect of the invention, a device for processing a video image is provided, which includes: a receiving module, configured to receive an original video image; a first processing module, configured to adjust a signal clock frequency of the original video image to acquire a processed video image; a second processing module, configured to, after a command signal input by a user is received, capture the processed video image according to a preset size to acquire a video image corresponding to a display window of the preset size; and an encoding module, configured to encode the video image corresponding to the display window of the preset size to acquire an encoded video image.

Alternatively, the command signal includes a preset abscissa and a preset ordinate, wherein the second processing module includes: a first computation module, configured to perform pixel point computation according to a first formula to acquire the maximum number $Ho$ of horizontal pixel points of the display window of the preset size, wherein the first formula is:

$$Ho = \frac{Po}{Pi} \times Hit - Hos,$$

wherein the $Po$ is a fixed pixel clock frequency, the $Pi$ is a pixel clock frequency of the original video image, the $Hit$ is the total number of line cycle clocks of the original video image, and the $Hos$ is a spacing of effective pixels between two lines of an output video; a first sub-processing module, configured to capture the horizontal pixel points with the maximum number of the display window of the preset size according to the preset abscissa to acquire horizontal pixel points of the display window of the preset size, and adopt vertical longitudinal points of a resolution of the original video image as vertical longitudinal pixel points of the display window of the preset size; and a second sub-processing module, configured to capture the processed video image according to the horizontal pixel points and the vertical longitudinal pixel points of the display window of the preset size to acquire the video image corresponding to the display window of the preset size.

Alternatively, the first processing module includes: an extracting module, configured to extract an original line signal, an original field signal, an original blanking signal and an original blanking masking signal from a control signal of the original video image; a first counting module, configured to perform reset count for the original field signal at jump points of the original field signal by taking the original line signal as a clock to acquire a field synchronization signal; a second counting module, configured to perform reset count for the original line signal at jump points of the original line signal by taking the fixed pixel clock frequency as a clock to acquire a line synchronization signal; a third counting module, configured to perform reset count for the original blanking signal at jump points which are moments greater than a synchronization head of the line synchronization signal, by taking the line synchronization signal as a clock to acquire a blanking synchronization signal; a fourth counting module, configured to perform reset count for the original blanking masking signal at jump points of the blanking synchronization signal by taking the blanking synchronization signal as a clock to acquire a blanking masking signal; and a fourth sub-processing module, configured to generate a control signal of the processed video image according to the field synchronization signal, the line synchronization signal, the blanking synchronization signal and the blanking masking signal, and acquire the processed video image.

Alternatively, after the receiving module receives the original video image, the device further includes: a third processing module, configured to receive the command signal input by the user and parse the command signal to acquire the preset abscissa and the preset ordinate.

Alternatively, before the first processing module adjusts the signal clock frequency of the original video image to acquire the processed video image, the device further includes: a detecting module, configured to detect whether a data signal of the original video image is a DDR signal; and a fourth processing module, configured to, in a case where the data signal of the original video image is the DDR signal, adjust a bit width of the data signal of the original video image to acquire an original video image signal of a clock single-edge transmission mode.

Alternatively, after the first processing module adjusts the signal clock frequency of the original video image to acquire the processed video image, the device further includes: a reading module, configured to perform a Ping-Pong operation for the processed video image by taking the signal clock frequency of the original video image as a storing clock and taking the blanking signal of the processed video image as a storing enable signal.

According to the method and device for processing the video image of the embodiment of the invention, new line, field and blanking synchronization signals are acquired through adjusting the clock frequency of an input image, and a new video image is acquired, and then, the corresponding capturing operation and outputting operation are performed according to the image display requirements of the user, so that the problem that the distortion of the displayed image is caused by scaling the video images to display the video images with different resolutions on the spliced screen in the prior art is solved, and the effect that video images with any resolution are reliably and stably displayed in the best display area range is realized.

BRIEF DESCRIPTION OF THE DRAWINGS

The accompanying drawings described herein serve to provide a further understanding of the invention, and constitute a part of this application. The schematic embodiments and the description of the schematic embodiments of the invention thereof serve to explain the invention rather than to limit the invention inappropriately. In the drawings.

DETAILED DESCRIPTION OF THE EMBODIMENTS

It should be noted that the embodiments of the application and the features of the embodiments may be combined with each other without any conflict. Hereinafter, the invention will be described in detail with reference to the accompanying drawings and in conjunction with the embodiments.

Figure 1:
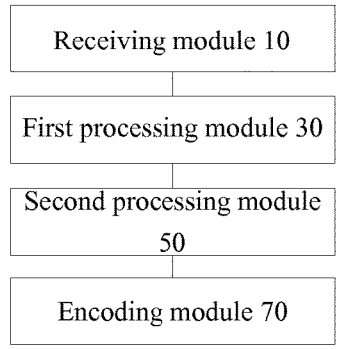
FIG. 1 is a structural diagram of a device for processing a video image according to an embodiment of the invention.

FIG. 1 is a structural diagram of a device for processing a video image according to an embodiment of the invention.

Figure 2:
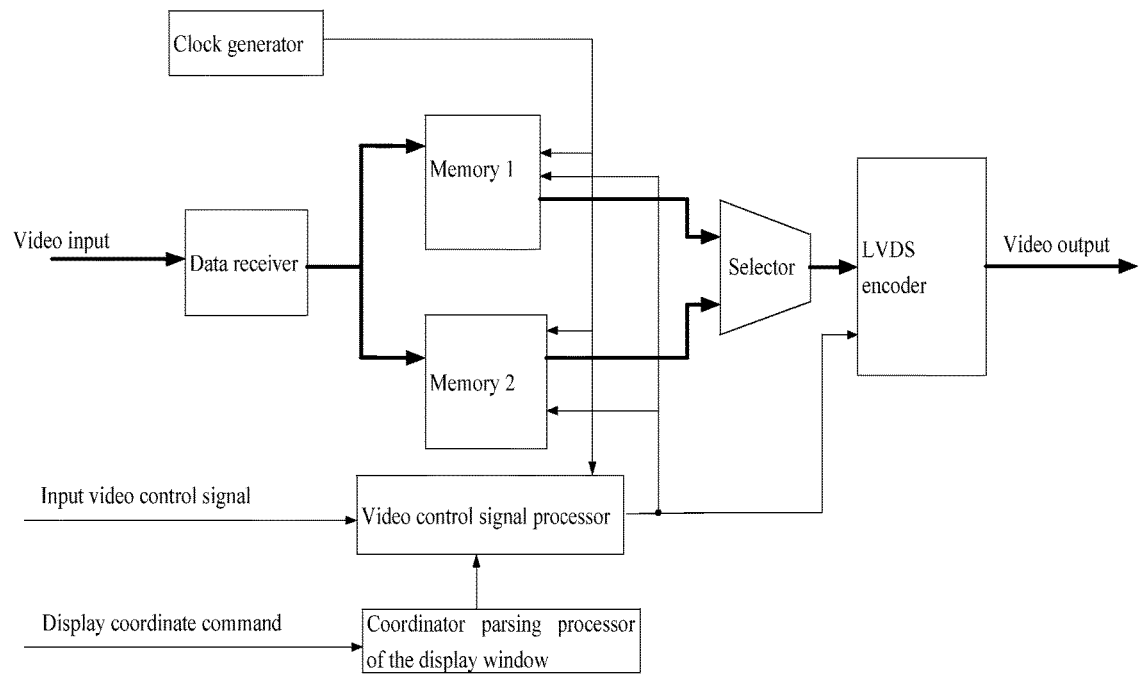
FIG. 2 is a detailed structural diagram of a device for processing a video image according to an embodiment of the invention.

FIG. 2 is a detailed structural diagram of a device for processing a video image according to an embodiment of the invention.

As shown in FIG. 1 and FIG. 2, the device includes: a receiving module 10, configured to receive an original video image; a first processing module 30, configured to adjust a signal clock frequency of the original video image to acquire a processed video image; a second processing module 50, configured to, after a command signal input by a user is received, capture the processed video image according to a preset size to acquire a video image corresponding to a display window of the preset size; and an encoding module 70, configured to encode the video image corresponding to the display window of the preset size to acquire an encoded video image.

According to the device for processing the video image of the embodiment of present application, the receiving module receives the input original video image, then the first processing module adjusts the signal clock frequency of the original video image to acquire the processed video image, the second processing module, after the command signal input by the user is received, captures the processed video image according to the preset size to acquire the video image corresponding to a display window of the preset size, and finally the encoding module encodes the video image corresponding to the display window of the preset size to acquire the encoded video image. According to the device for processing the video image of the embodiment of present application, a new video image is acquired through adjusting the clock frequency of the input image, and then, the corresponding capturing operation and outputting operation are performed according to the image display requirements of the user, so as to solve the problem that the distortion of the displayed image is caused by scaling the video images in order to display the video images of different resolutions on the spliced screen in the prior art, and the effect that video images of any resolution are reliably and stably displayed in the best display area range is realized.

In the above embodiment, the second processing module 50 opens the display window, and then defines and outputs the video image through setting pixel coordinates (for example, the abscissa is X, and the ordinate is Y) on the left top corner of the image display area, so as to realize the capture and the output of the processed video image, and the area sizes of the effective image display window opened are different depending on different resolutions of the input images (i.e., the original video image in the above embodiment). The display window of the preset size may be of the size of the display screen of the spliced full-colour LED display.

In the above embodiment, as shown in FIG. 2, the encoding module 70 may be implemented through an LVDS encoder, that is, the encoder outputs an output video of the corresponding display window to the display window in a way of a serial bit rate, such as parallel to serial processing is performed in a way of 10:1. In this way, the bit rate of the LVDS is 10 times of the output clock frequency of the display window. If Po is the pixel clock of the display window of 75 Mhz, the bit rate of the LVDS reaches 750 Mbps. Since the LVDS is a low voltage differential transmission, the features of high transmission bit rate, small power consumption, high reliability and less transmission pins may be realized.

According to the embodiment of the application, the command signal includes a preset abscissa and a preset ordinate, wherein the second processing module includes: a first computation module, configured to perform pixel point computation according to a first formula to acquire the maximum number Ho of the horizontal pixel points of the display window of the preset size, wherein the first formula is:

$$Ho = \frac{Po}{Pi} \times Hit - Hos,$$

where Po is a fixed pixel clock frequency, Pi is a pixel clock frequency of the original video image, Hit is the total number of line cycle clocks of the original video image, and Hos is a spacing of effective pixels between two lines of an output video; a first sub-processing module, configured to capture the horizontal pixel points with the maximum number of the display window of the preset size according to the preset abscissa to acquire horizontal pixel points of the display window of the preset size, and adopt vertical longitudinal points of a resolution of the original video image as vertical longitudinal pixel points of the display window of the preset size; and a second sub-processing module, configured to capture the processed video image according to the horizontal pixel points and the vertical longitudinal pixel points of the display window of the preset size to acquire the video image corresponding to the display window of the preset size. The function of the above second processing module may be realized through a video control signal processor shown in FIG. 2. Specifically, the processed video control signal is generated according to a field synchronization signal, a line synchronization signal, a blanking synchronization signal and a blanking masking signal, and a digital signal of the original video image is corrected according to the processed video control signal to acquire the processed video image.

Specifically, the first computation module performs the pixel point computation according to the first formula to acquire the maximum number Ho of the horizontal pixel points of the display window of the preset size, then the first sub-processing module captures the horizontal pixel points with the maximum number of the display window of the preset size according to the preset abscissa to acquire horizontal pixel points of the display window of the preset size, and adopts the vertical longitudinal points of the resolution of the original video image as the vertical longitudinal pixel points of the display window of the preset size, and finally a third sub-processing module captures the processed video image according to the horizontal pixel points and the vertical longitudinal pixel points of the display window of the preset size acquired by the second sub-processing module to acquire the video image corresponding to the display window of the preset size.

The first formula is:

$$Ho = \frac{Po}{Pi} \times Hit - Hos,$$

wherein Po which is a constant, is the fixed pixel clock frequency, Pi is the pixel clock frequency of the original video image, Hit is the total number of line cycle clocks of the original video image, and Hos is the spacing of effective pixels between two lines of the output video, and Ho is also the maximum number of the pixel points read by a memory.

Figure 3:
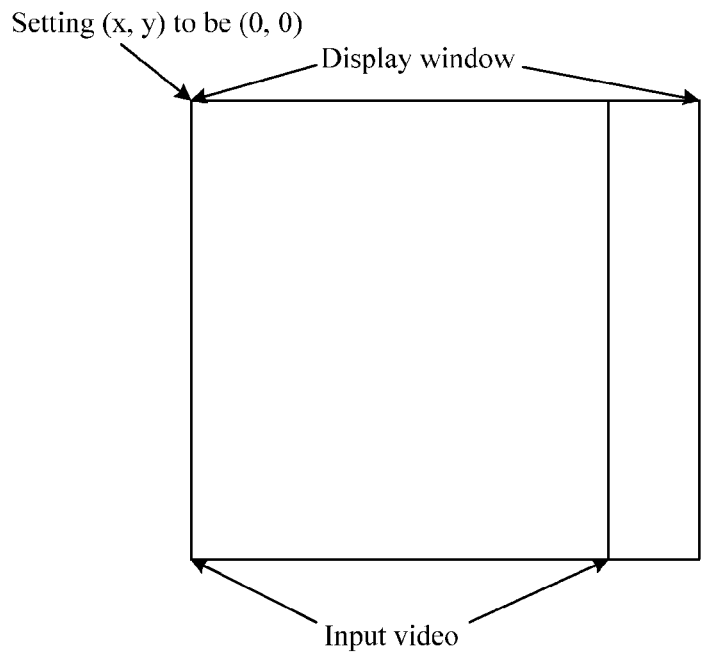
FIG. 3 is a schematic diagram of a first horizontal picture where a display window outputs a video image according to an embodiment of the invention.
Figure 4:
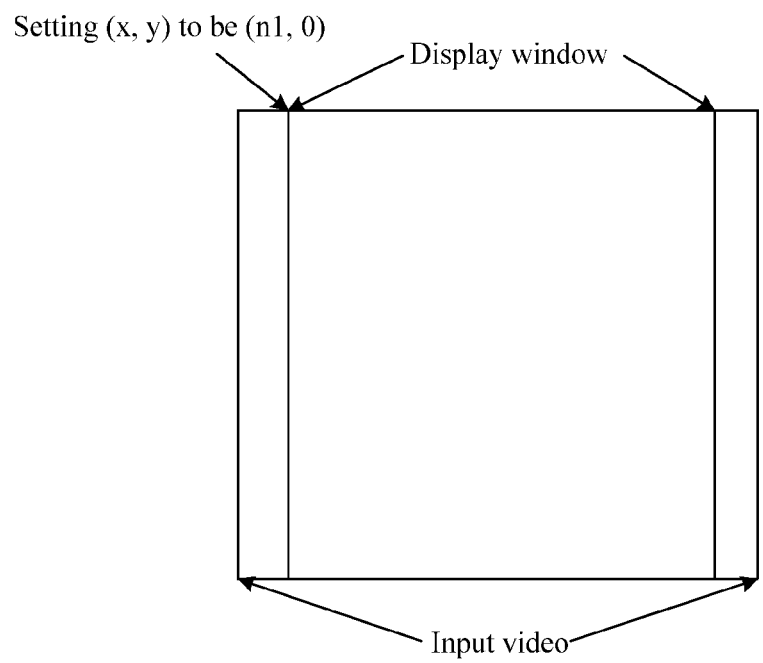
FIG. 4 is a schematic diagram of a second horizontal picture where a display window outputs a video image according to an embodiment of the invention.
Figure 5:
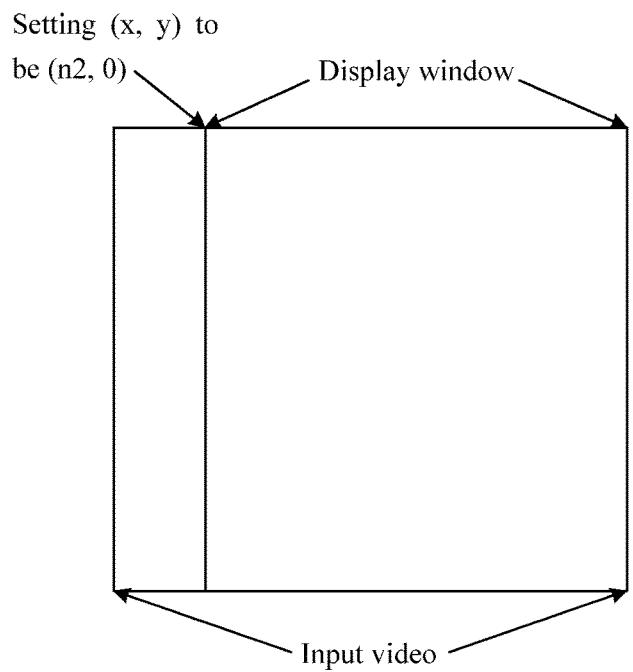
FIG. 5 is a schematic diagram of a third horizontal picture where a display window outputs a video image according to an embodiment of the invention.
Figure 6:
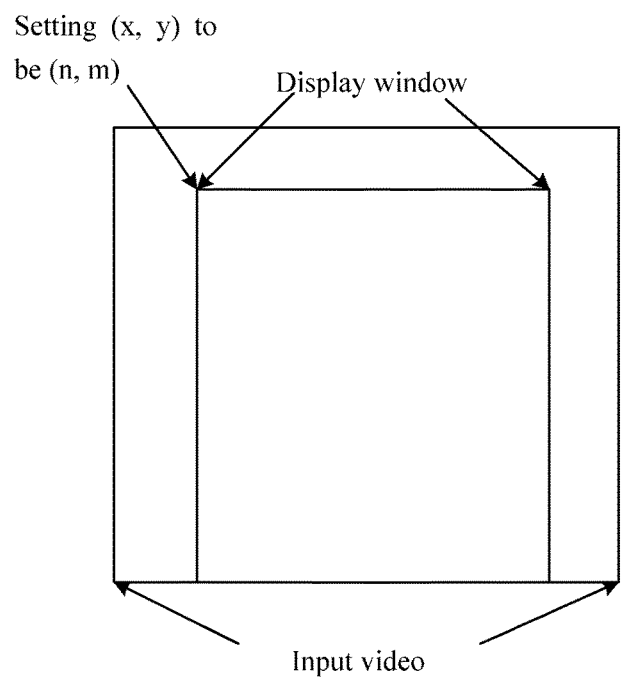
FIG. 6 is a schematic diagram of a longitudinal picture where a display window outputs a video image according to an embodiment of the invention.
Figure 7:
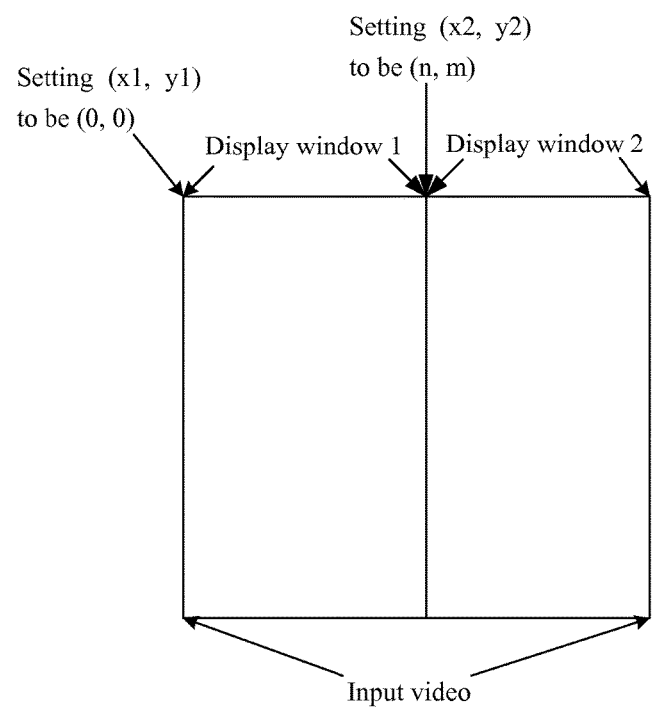
FIG. 7 is a schematic diagram of a spliced picture where a display window outputs a video image according to an embodiment of the invention.

FIG. 3 is a schematic diagram of a first horizontal picture where a display window outputs a video image according to an embodiment of the invention. FIG. 4 is a schematic diagram of a second horizontal picture where a display window outputs a video image according to an embodiment of the invention. FIG. 5 is a schematic diagram of a third horizontal picture where a display window outputs a video image according to an embodiment of the invention. FIG. 6 is a schematic diagram of a longitudinal picture where a display window outputs a video image according to an embodiment of the invention. FIG. 7 is a schematic diagram of a spliced screen where a display window outputs a video image according to an embodiment of the invention. In the above, all of the display windows in above FIG. 3 to FIG. 7 may be the display windows of the preset size, all of the input videos may be the video images processed by the first processing module 30.

For example, by taking the resolution M*N of the input video image (i.e., the original video image) as an example, if the video data of the opened image display window is set to be output with fixed Po, the maximum number Ho of the horizontal effective pixel points of the opened display window can be $$Ho = \frac{Po}{Pi} \times Hit - Hos.$$

In the above formula, Ho is the maximum number of the pixel points output by the display window of the preset size, Po is the fixed pixel clock frequency, Pi is the pixel clock frequency of the input video (that is, the original video image in the above embodiment), Hit is the total number of line cycle clocks of the input image, and Hos is the spacing of effective pixels between two lines of the output video, that is, the time interval between the last effective pixel of the previous line and the first effective pixel of the next line of two adjacent lines (computed by the number of the pixel clock cycles). The bigger the fixed frequency Po is, the bigger of the size of the opened window is, but the stability of the system will be influenced. In the embodiment, the fixed clock frequency Po may be 75 Mhz.

In the above embodiment, as shown in FIG. 3, if Po>Pi, the opened window of the preset size can output the horizontal pixel points of the resolution of the input video completely, that is, the horizontal width of the opened display window of the preset size is greater than the horizontal width of the original video image. Specifically, if the abscissa X of an initial position on the left top corner of the display window is set to be 0 by a user, the first pixel displayed by the opened window is the first pixel point of the input video image (i.e., the original video image), and if the number of the horizontal pixel points of the opened window is greater than the number of the horizontal pixel points of the input image, the horizontal picture of the input image can be completely displayed.

As shown in FIG. 4 and FIG. 5, if the number of the horizontal points of the input image is greater than the number of the horizontal points of the opened window, the image displayed in the opened window is one area of the input image, and the area is shifted through a set X coordinate. If the preset coordinate input by the user is (n1, 0), the processed video image is shifted by n1 coordinates to the right. If the preset coordinate input by the user is (n2, 0), the processed video image is shifted by n2 coordinates to the right.

In the above embodiment of the application, the maximum displayable number of the vertical longitudinal points of the display window of the preset size is the same as the number of the vertical points of the effective pixel of the actually input image. For example, for the image resolution of 1280*1024@60 hz, the maximum number of the vertical points of the display window is 1024. As shown in FIG. 6, when the Y coordinate set by the user is 0, the number of the vertical points of the display window is just the same as the number of the vertical points of the input image. However, since the actual applied number of the points of the full-colour LED screen may be unspecified, the user may also choose the display of the image through adjusting the Y coordinate according to the embodiment shown in FIG. 6, that is, the coordinate of the first pixel point of the first line and the first column of the output video image of the display window is set according to the preset coordinate (n, m) input by the user.

It can be seen from the above description that in the above embodiment of the application, the user may adjust the display area of the full-colour LED screen arbitrarily, and captures the image from the processed video image to obtain the best display image. Additionally, as shown in FIG. 7, the user may also splice the high-resolution image through increasing the output of the display window. If the number of the horizontal pixel points of the processed video image is twice of the maximum number of the horizontal pixel points of the display window of the preset size, two display screens may be spliced for display. If the preset coordinates of the two display screens of the user are respectively (0, 0) and (n, 0), the coordinate points (x1, y1) and (x2, y2) of the first pixel point of the first line of the two display screens are respectively (0, 0) and (n, 0), where n=x1+1, and m in FIG. 7 may be 0.

For the set Y coordinate, the field, line and blanking signals newly generated in the above step need to be adjusted. If the set coordinate Y is 15, the counting operation needs to be performed by taking a new blanking synchronization signal as the clock, and the resetting operation is performed according to the new field synchronization jump and a corresponding blanking masking signal is generated. For example, the masking signal is invalid, i.e., 0 for the count value of 0-14, while the masking signals are valid for the rest. The data from line 0-14 is shielded after being masked, at the same time, a field synchronization signal is shifted backwards by a time value of 15 blanking cycles to keep the same phase with the first blanking line data.

Additionally, the generation and operation of the new video control signal and the clock read by the memory may be realized in the case that the clock generator shown in FIG. 2 is at the set fixed pixel clock frequency.

Through the above embodiment of the application, any area of the image may be displayed and spliced, and the requirement for actual application of the LED may be met flexibly, the signal transmission with the LED screen is realized at a fixed low transmission bit rate to ensure the reliability of the system.

In the above embodiment of the invention, the first processing module 30 may include: an extracting module, configured to extract an original line signal, an original field signal, an original blanking signal and an original blanking masking signal from a control signal of the original video image; a first counting module, configured to perform reset count for the original field signal at jump points of the original field signal by taking the original line signal as the clock to acquire a field synchronization signal; a second counting module, configured to perform reset count for the original line signal at jump points of the original line signal by taking the fixed pixel clock frequency as the clock to acquire a line synchronization signal; a third counting module, configured to perform reset count for the original blanking signal at jump points which are moments greater than a synchronization head of the line synchronization signal, by taking the line synchronization signal as the clock to acquire a blanking synchronization signal; a fourth counting module, configured to perform reset count for the original blanking masking signal at the jump points of the blanking synchronization signal by taking the blanking synchronization signal as the clock to acquire a blanking masking signal; and a fourth sub-processing module, configured to generate the control signal of the processed video image according to the field synchronization signal, the line synchronization signal, the blanking synchronization signal and the blanking masking signal, and acquire the processed video image.

Specifically, the extracting module extracts the original line signal, the original field signal, the original blanking signal and the original blanking masking signal from the control signal of the original video image, and applies the above signals to the counting operation of the following modules. In the above, the first counting module performs reset count for the original field signal at the jump points of the original field signal by taking the original line signal as the clock to acquire the field synchronization signal. The second counting module performs reset count for the original line signal at the jump points of the original line signal by taking the fixed pixel clock frequency as the clock to acquire the line synchronization signal. The third counting module performs reset count for the original blanking signal at jump points which are moments greater than a synchronization head of the line synchronization signal, by taking the line synchronization signal as the clock to acquire the blanking synchronization signal. The fourth counting module performs reset count for the original blanking masking signal at the jump points of the blanking synchronization signal by taking the blanking synchronization signal as the clock to acquire the blanking masking signal. After above modules perform above operation, the fourth sub-processing module generates the control signal of the processed video image according to the field synchronization signal, the line synchronization signal, the blanking synchronization signal and the blanking masking signal acquired by above modules, and acquires the processed video image.

Figure 8:
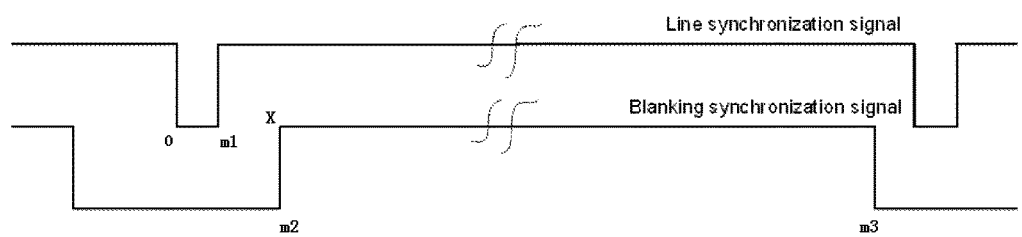
FIG. 8 is a schematic diagram of a waveform of counting process of a third counting module of a user according to an embodiment of the invention.

FIG. 8 is a schematic diagram of a waveform of the counting process of the third counting module of a user according to an embodiment of the invention.

For example, the first counting module performs the clock frequency process for the control signal of the original video to generate the field synchronization signal. The field signal output by the video takes the jump of the original field signal (i.e., the field signal in the control signal of the original video image) as a boundary, and the reset count is performed for the original field signal by taking the line signal as a clock. During this counting, 0-n1 (0 to n1) is set to be the synchronization head of the field signal, and the electrical level of the field signal is low, and other count values are high, and a new field synchronization signal (i.e., the field synchronization signal in the above embodiment) is generated. The second counting module performs the clock frequency process for the control signal of the original video to generate the field synchronization signal. The new line synchronization signal takes the jump of the original line signal (i.e., the line signal in the control signal of the original video image) as a boundary, and the reset count is performed for the new line synchronization signal by taking the output clock (i.e., the fixed clock frequency Po) as a clock, wherein 0-m1 is set to be the line signal synchronization (that is, the electrical level of the line signal is low), other count values are high, and a new line synchronization signal (i.e., the line synchronization signal in the above embodiment) is generated. The third counting module performs the clock frequency process for the control signal of the original video to generate the field synchronization signal. As shown in FIG. 8, a new blanking synchronization signal is generated by taking the new line synchronization signal as the clock, and the synchronization head of the new blanking synchronization signal is greater than the synchronization head of the new line synchronization signal. Additionally, the new blanking synchronization signal is closely linked to the reading of the memory. Once the blanking signal is high, the memory reads and outputs the first data of the corresponding line of the display window of the preset size. For example, if 0–m2 (m2>m1) is set to be low blanking signal, the pixel data of the memory is read from m2+1. During (m2+1)–m3, the blanking signal is high, i.e., it is the time of outputting the pixel data, and apart from this, the blanking signal becomes low.

According to the above embodiment of the application, after the receiving module 10 receives the original video image, the device may further include: a third processing module, configured to receive a command signal input by a user and parsing the command signal to acquire the preset abscissa and the preset ordinate.

Specifically, after the receiving module receives the original video image, the device may further include the third processing module, that is, a parsing processor of a coordinate of the display window shown in FIG. 2 parses the command signal input by the user, and a command word(s) is generally transmitted in a way of an SPI protocol, wherein the command word includes a command keyword, a command address, and command data. Through the parsing operation of the SPI protocol, the command is parsed to be address, data and control signal in parallel which are transmitted to a corresponding processing module.

In the above embodiment of the application, before the first processing module 30 adjusts the signal clock frequency of the original video image to acquire the processed video image, the device may further include: a detecting module, configured to detect whether a data signal of the original video image is a DDR signal; and a fourth processing module, configured to, in a case where the data signal of the original video image is the DDR signal, adjust a bit width of the data signal of the original video image to acquire an original video image of a clock single-edge transmission mode.

Specifically, the input video image (i.e., the original video image in the above embodiment) is received by the receiving module 10 (the function of the receiving module may be realized through a data receiver shown in FIG. 2). In the above embodiment, after the receiving module 10 receives the original video image, the video data signal may be extracted from the original video image through the data receiver, and the data synchronization operation is performed for the video data signal, that is, the bit width is adjusted. If the video data signal is the DDR signal, the DDR double-edge input mode is adjusted to the clock single-edge output mode. Moreover, after the first processing module 30 adjusts the signal clock frequency of the original video image to acquire the processed video image, the video data signal acquired by the above module may be adjusted to acquire the processed video data.

Additionally, after the first processing module 30 adjusts the signal clock frequency of the original video image to acquire the processed video image, the device may further include: a reading module, configured to perform Ping-Pong access operation for the processed video image by taking the signal clock frequency of the original video image as a storing clock and taking the blanking signal of the processed video image as a storing enable signal.

Specifically, after the first processing module 30 adjusts the signal clock frequency of the original video image to acquire the processed video image, the reading module performs Ping-Pong access operation for the processed video image, wherein the reading module may be realized by using two memories the size of each of which is 2048 bit (or 4096 bit). Specifically, in one line cycle, one memory 1 stores a video image, and the other memory 2 reads the video image, and in a next line cycle, one memory 2 stores a video image, and the other memory 1 reads the video image. That is, above access operation is performed in turn. When the data is stored, by taking the original input clock as the storing clock and taking the blanking signal as the storing enable signal, the line data is accessed incrementally orderly from the leftmost side to the rightmost side starting from the address 0 in the case that the address is progressively increased by starting from the address 0 according to the tick of the clock, wherein one pixel point data is accessed through each address.

Additionally, before the encoding module 70 encodes the video image corresponding to the display window of the preset size to acquire the encoded video image, the device may further include a selector, wherein the selector may switch the read memory for which the Ping-Pong operation is performed, that is, always switches to the read memory for outputting data of the read memory.

Figure 9:
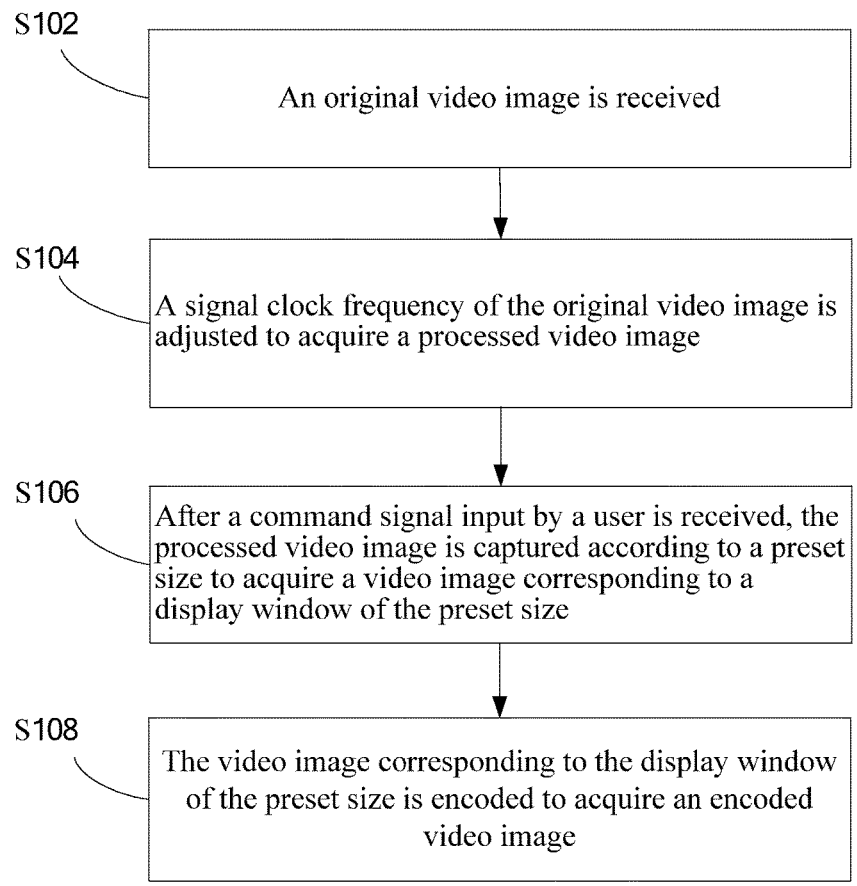
FIG. 9 is a flowchart of a method for processing a video image according to an embodiment of the invention.
Figure 10:
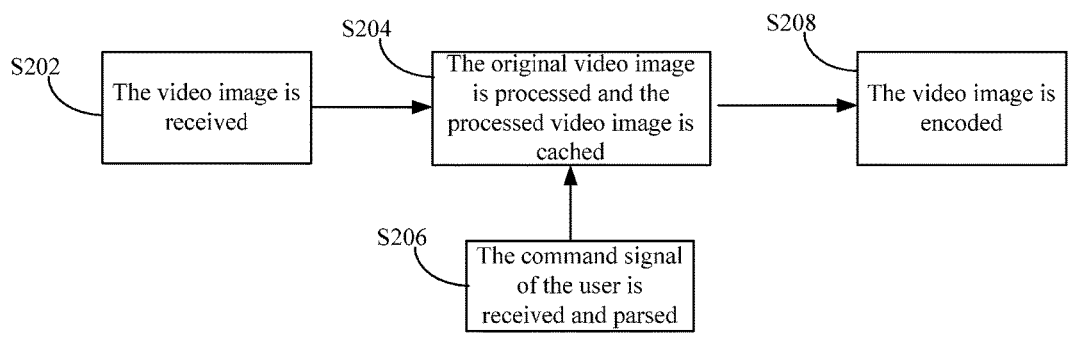
FIG. 10 is a flowchart of a method for processing a video image according to an embodiment shown in FIG. 9.

FIG. 9 is a flowchart of a method for processing a video image according to an embodiment of the invention. FIG. 10 is a flowchart of a method for processing a video image according to an embodiment shown in FIG. 9.

As shown in FIG. 9 and FIG. 10, the method includes the following steps:

Step 102: an original video image is received.

Step 104: a signal clock frequency of the original video image is adjusted to acquire a processed video image.

Step 106: after a command signal input by a user is received, the processed video image is captured according to a preset size to acquire a video image corresponding to a display window of the preset size.

Step 108: the video image corresponding to the display window of the preset size is encoded to acquire an encoded video image.

According to the method for processing the video image of the embodiment of the application, the input original video image is received; then the signal clock frequency of the original video image is adjusted to acquire the processed video image; after the command signal input by the user is received, the processed video image is captured according to the preset size to acquire the video image corresponding to a display window of the preset size; and finally the video image corresponding to the display window of the preset size is encoded to acquire the encoded video image. According to the method for processing the video image of the embodiment of the application, a new video image is acquired through adjusting the clock frequency of the input image, and then the corresponding capturing operation and outputting operation are performed according to the image display requirements of the user, so that the problem is solved that the distortion of the displayed image is caused by scaling the images to display the images on the spliced screens in the case where the resolution or field frequency of the input videos are different in the prior art, and the effect that video images with any resolution are reliably and stably displayed in the best display area range is realized.

Step 102 in the above embodiment may be realized by receiving the video image in Step 202 shown in FIG. 10. In Step 204, the original video image is processed and the processed video image is cached. Step 104 to Step 106 in the above embodiment may be realized in Step 204 in FIG. 10. Step 108 in FIG. 9 may be realized through Step 208 in FIG. 10, wherein the video image is encoded in Step 208. Specifically, Step 106 may be realized by the following: the display window is opened, and then the video image is defined and output through setting pixel coordinates (for example, the abscissa is X, and the ordinate is Y) on the left top corner of the image display area to realize the capture and the output of the processed video image, and the area sizes of the effective image display window opened are different depending on different resolutions of the input images (i.e., the original video image in the above embodiment). The display window of the preset size may be of the size of the display screen of the spliced full-colour LED display. Additionally, Step 204 may also be performed after Step 206 in which the command signal of the user is received and parsed.

In the above embodiment, Step 108 may be realized through an LVDS encoder. That is, the encoder outputs an output video of the corresponding display window to the display window in a way of a serial bit rate, such as parallel to serial processing is performed in a way of 10:1. In this way, the bit rate of the LVDS is 10 times of the output clock frequency of the display window. If Po is the pixel clock of the display window of 75 Mhz, the bit rate of the LVDS reaches 750 Mbps. Since the LVDS is a low voltage differential transmission, the features of high transmission bit rate, small power consumption, high reliability and less transmission pins may be realized.

In the above embodiment of the application, the command signal includes a preset abscissa and a preset ordinate, wherein after the command signal input by the user is received, the step of capturing the processed video image according to the preset size to acquire the video image corresponding to the display window of the preset size includes: performing a pixel point computation according to a first formula to acquire the maximum number Ho of the horizontal pixel points of the display window of the preset size, wherein the first formula is:

$$Ho = \frac{Po}{Pi} \times Hit - Hos,$$

where Po is a fixed pixel clock frequency, Pi is a pixel clock frequency of the original video image, Hit is the total number of line cycle clocks of the original video image, and Hos is a spacing of effective pixels between two lines of an output video; capturing the horizontal pixel points with the maximum number of the display window of the preset size according to the preset abscissa to acquire horizontal pixel points of the display window of the preset size; adopting vertical longitudinal points of a resolution of the original video image as vertical longitudinal pixel points of the display window of the preset size; and capturing the processed video image according to the horizontal pixel points and the vertical longitudinal pixel points of the display window of the preset size to acquire the video image corresponding to the display window of the preset size. In the above, the processed video control signal is generated according to a field synchronization signal, a line synchronization signal, a blanking synchronization signal and a blanking masking signal, and a digital signal of the original video image is corrected according to the processed video control signal to acquire the processed video image.

Specifically, the command signal includes the preset abscissa and the preset ordinate, wherein after the command signal input by the user is received, the step of capturing the processed video image according to the preset size to acquire the video image corresponding to the display window of the preset size is realized in the following way: performing the pixel point computation according to the first formula to acquire the maximum number Ho of the horizontal pixel points of the display window of the preset size, capturing the horizontal pixel points with the maximum number of the display window of the preset size according to the preset abscissa to acquire the horizontal pixel points of the display window of the preset size; adopting the vertical longitudinal points of the resolution of the original video image as the vertical longitudinal pixel points of the display window of the preset size; and capturing the processed video image according to the horizontal pixel points and the vertical longitudinal pixel points of the display window of the preset size to acquire the video image corresponding to the display window of the preset size. The first formula is:

$$Ho = \frac{Po}{Pi} \times Hit - Hos,$$

wherein Po is the fixed pixel clock frequency, Pi is the pixel clock frequency of the original video image, Hit is the total number of line cycle clocks of the original video image, and Hos is the spacing of effective pixels between two lines of the output video.

FIG. 3 is a schematic diagram of a first horizontal picture where a display window outputs a video image according to an embodiment of the invention. FIG. 4 is a schematic diagram of a second horizontal picture where a display window outputs a video image according to an embodiment of the invention. FIG. 5 is a schematic diagram of a third horizontal picture where a display window outputs a video image according to an embodiment of the invention. FIG. 6 is a schematic diagram of a longitudinal screen picture where a display window outputs a video image according to an embodiment of the invention. FIG. 7 is a schematic diagram of a spliced screen where a display window outputs a video image according to an embodiment of the invention. In the above, all of the display windows in above FIG. 3 to FIG. 7 may be the display windows of the preset size, all of the input videos may be the video images processed by the first processing module 30.

For example, by taking the resolution M*N of the input video image (i.e., the original video image) as an example, if the video data of the opened image display window is set to be output with fixed Po, the maximum number Ho of the horizontal effective pixel points of the opened display window can be $$Ho = \frac{Po}{Pi} \times Hit - Hos.$$

In the above formula, Ho is the maximum number of the pixel points output by the display window of the preset size, Po is the fixed pixel clock frequency, Pi is the pixel clock frequency of the input video (that is, the original video image in the above embodiment), Hit is the total number of line cycle clocks of the input image, and Hos is the spacing of effective pixels between two lines of the output video, that is, the time interval between the last effective pixel of the previous line and the first effective pixel of the next line of two adjacent lines (computed by the number of the pixel clock cycles). In the above, the bigger the fixed frequency Po is, the bigger of the size of the opened window is, but the stability of the system will be influenced. In the embodiment, the fixed pixel clock frequency Po may be 75 Mhz.

In the above embodiment, as shown in FIG. 3, if Po>Pi, the opened window of the preset size can output the horizontal pixel points of the resolution of the input video completely, that is, the horizontal width of the opened display window of the preset size is greater than the horizontal width of the original video image. Specifically, if the abscissa X of an initial position on the left top corner of the display window is set to be 0 by a user, the first pixel displayed by the opened window is the first pixel point of the input video image (i.e., the original video image), and if the number of the horizontal pixel points of the opened window is greater than the number of the horizontal pixel points of the input image, the horizontal picture of the input image can be completely displayed.

As shown in FIG. 4 and FIG. 5, if the number of the horizontal points of the input image is greater than the number of the horizontal points of the opened window, the image displayed in the opened window is one area of the input image, and the area is shifted through a set X coordinate. If the preset coordinate input by the user is (n1, 0), the processed video image is shifted by n1 coordinates to the right. If the preset coordinate input by the user is (n2, 0), the processed video image is shifted by n2 coordinates to the right.

In the above embodiment of the application, the maximum displayable number of the vertical longitudinal points of the display window of the preset size is the same as the number of the vertical points of the effective pixel of the actually input image. For example, for the image resolution of 1280*1024@60 hz, the maximum number of the vertical points of the display window is 1024. As shown in FIG. 6, when the Y coordinate set by the user is 0, the number of the vertical points of the display window is just the same as the number of the vertical points of the input image. However, since the actual applied number of the points of the full-colour LED screen may be unspecified, the user may also choose the display of the image through adjusting the Y coordinate according to the embodiment shown in FIG. 6, that is, the coordinate of the first pixel point of the first line and the first column of the output video image of the display window is set according to the preset coordinate (n, m) input by the user.

It can be seen from the above description that in the above embodiment of the application, the user may adjust the display area of the full-colour LED screen arbitrarily, and captures the image from the processed video image to obtain the best display image. Additionally, as shown in FIG. 7, the user may also splice the high-resolution image through increasing the output of the display window. If the number of the horizontal pixel points of the processed video image is twice of the maximum number of the horizontal pixel points of the display window of the preset size, two display screens may be spliced for display. If the preset coordinates of the two display screens of the user are respectively (0, 0) and (n, 0), the coordinate points (x1, y1) and (x2, y2) of the first pixel point of the first line of the two display screens are respectively (0, 0) and (n, 0), where n=x1+1, and m in FIG. 7 may be 0.

For the set Y coordinate, the field, line and blanking signals newly generated in the above step need to be adjusted. If the set coordinate Y is 15, the counting operation needs to be performed by taking a new blanking synchronization signal as the clock, and the resetting operation is performed according to the new field synchronization jump and a corresponding blanking masking signal is generated. For example, the masking signal is invalid, i.e., 0 for the count value of 0-14, while the masking signals are valid for the rest. The data from line 0-14 is shielded after being masked, at the same time, a field synchronization signal is shifted backwards by a time value of 15 blanking cycles to keep the same phase with the first blanking line data.

Additionally, the generation and operation of the new video control signal and the clock read by the memory may be realized at the set fixed pixel clock frequency.

Through the above embodiment of the application, any area of the image may be displayed and spliced, and the requirement for actual application of the LED may be met flexibly, the signal transmission with the LED screen is realized at a fixed low transmission bit rate to ensure the reliability of the system.

In the above embodiment of the invention, the step of adjusting the signal clock frequency of the original video image to acquire the processed video image may include: extracting an original line signal, an original field signal, an original blanking signal and an original blanking masking signal from a control signal of the original video image; performing the reset count for the original field signal at jump points of the original field signal by taking the original line signal as a clock to acquire a field synchronization signal; performing the reset count for the original line signal at the jump points of the original line signal by taking the fixed pixel clock frequency as the clock to acquire a line synchronization signal; performing the reset count for the original blanking signal at jump points which are moments greater than a synchronization head of the line synchronization signal, by taking the line synchronization signal as the clock to acquire a blanking synchronization signal; performing the reset count for the original blanking masking signal at the jump points of the blanking synchronization signal by taking the blanking synchronization signal as the clock to acquire a blanking masking signal; and generating the processed video control signal according to the field synchronization signal, the line synchronization signal, the blanking synchronization signal and the blanking masking signal, and acquiring the processed video image.

Specifically, the original line signal, the original field signal, the original blanking signal and the original blanking masking signal are extracted from the control signal of the original video image, and then the clock frequency computation is performed for a signal in the original video signal to generate a new control signal, and the processed video image is acquired according to the new control signal generated. In the above, the step of performing the clock frequency computation for the signal of the original video signal may be realized through the following steps: the reset count is performed for the original field signal at the jump points of the original field signal by taking the original line signal as the clock to acquire the field synchronization signal; the reset count is performed for the original line signal at the jump points of the original line signal by taking the fixed pixel clock frequency as the clock to acquire the line synchronization signal; the reset count is performed for the original blanking signal at jump points which are moments greater than a synchronization head of the line synchronization signal, by taking the line synchronization signal as the clock to acquire the blanking synchronization signal; the reset count is performed for the original blanking masking signal at the jump points of the blanking synchronization signal by taking the blanking synchronization signal as the clock to acquire the blanking masking signal.

For example, the field signal output by the video takes the jump of the original field signal (i.e., the field signal in the control signal of the original video image) as a boundary, and the reset count is performed for the original field signal by taking the line signal as a clock. During this counting, 0-n1 (0 to n1) is set to be the synchronization head of the field signal, and the electrical level of the field signal is low, and other count values are high, and a new field synchronization signal (i.e., the field synchronization signal in the above embodiment) is generated. The new line synchronization signal takes the jump of the original line signal (i.e., the line signal in the control signal of the original video image) as a boundary, and the reset count is performed for the new line synchronization signal by taking the output clock (i.e., the fixed clock frequency Po) as a clock, wherein 0-m1 is set to be the line signal synchronization (that is, the electrical level of the line signal is low), other count values are high, and a new line synchronization signal (i.e., the line synchronization signal in the above embodiment) is generated. And for the new blanking synchronization signal, as shown in FIG. 8, the new blanking synchronization signal is generated by taking the new line synchronization signal as the clock, and the synchronization head of the new blanking synchronization signal is greater than the synchronization head of the new line synchronization signal. Additionally, the new blanking synchronization signal is closely linked to the reading of the memory. Once the blanking signal is high, the memory reads and outputs the first data of the corresponding line of the display window of the preset size. If 0-m2 (m2>m1) is set to be low blanking signal, the pixel data of the memory is read from m2+1. During (m2+1)-m3, the blanking signal is high, i.e., it is the time of outputting the pixel data, and apart from this, the blanking signal becomes low.

According to the above embodiment of the application, after the original video image is received, the method may further include: receiving the command signal input by the user and parsing the command signal to acquire the preset abscissa and the preset ordinate.

Specifically, as shown in FIG. 10, the step may be realized through Step 206 in FIG. 10: the command signal of the user is received and parsed, generally a command word is transmitted in a way of an SPI protocol, including a command keyword, a command address, and a command data. Through parsing by the SPI protocol, the command is parsed to be address, data and control signal in parallel which are transmitted to a corresponding processing module.

In the above embodiment of the application, before the signal clock frequency of the original video image is adjusted to acquire the processed video image, the method may further include: detecting whether a data signal of the original video image is a DDR signal; and in a case where the data signal of the original video image is the DDR signal, adjusting a bit width of the data signal of the original video image to acquire an original video image signal of a clock single-edge transmission mode.

Specifically, above steps are finished in data caching and processing steps in FIG. 10, and after the input video image (i.e., the original video image) is received, the video data signal may be extracted from the original video image, and the data synchronization is performed for the video data signal, that is, the bit width is adjusted. If the video data signal is the DDR signal, the DDR double-edge input mode is adjusted to the clock single-edge output mode.

According to the above embodiment of the application, after the signal clock frequency of the original video image is adjusted to acquire the processed video image, the method may further include: performing Ping-Pong access operation for the processed video image by taking the signal clock frequency of the original video image as a storing clock and taking the blanking signal of the processed video image as a storing enable signal.

Specifically, after the original video image is received, the Ping-Pong access operation is performed for the processed video image. Specifically, the step may be realized by using two memories the size of each of which is 2048 bit (or 4096 bit) through the following method: in a line cycle, one memory 1 stores a video image, and the other memory 2 reads the video image, and in a next line cycle, one memory 2 stores a video image, and the other memory 1 reads the video image. That is, above access operation is performed in turn. When the data is stored, by taking the original input clock as the storing clock and taking the blanking signal as the storing enable signal, the line data is accessed incrementally orderly from the leftmost side to the rightmost side starting from the address 0 in the case that the address is progressively increased by starting from the address 0 according to the tick of the clock, wherein one pixel point data is accessed through each address.

Additionally, in the method, a selector may be used to switch the read memory for which the Ping-Pong operation is performed, that is, always switch to the read memory for outputting data of the read memory.

It should be noted that the steps shown in the flowcharts of the drawings may be executed in a computer system having a group of computer-executable instructions, and although a logic sequence is shown in the flowcharts, in some cases, the steps shown or described may be executed in an order different from here.

It can be seen from the above description that the invention realizes the technical effects as follows: According to the method and device for processing the video image disclosed by the embodiment of the invention, new line, field and blanking synchronization signals are acquired through adjusting the clock frequency of an input image, and a new video image is acquired, and then, the corresponding capturing operation and outputting operation is performed according to the image display requirements of the user, so that the problem that the distortion of the displayed image is caused by scaling the video images to display the video images with different resolutions on the spliced screen in the prior art is solved, and the effect that video images with any resolution are reliably and stably displayed in the best display area range is realized.

Obviously, those skilled in the art should understand that each of the mentioned modules or steps of the invention may be achieved by a universal computing device; the modules or steps may be focused on a single computing device, or distributed on the network formed by multiple computing devices. Optionally, they may be implemented by a program code which may be executed by the computing device. Thereby, the modules or steps may be stored in a storage device and executed by the computing device, or may be respectively manufactured as each integrated circuit module, or multiple modules or steps thereof may be manufactured as a single integrated circuit module, thus to be implemented. In this way, the invention is not limited to any particular hardware and software combination.

The above are only the preferred embodiments of the invention and are not intended to limit the invention, for those skilled in the art, various changes and variations may be made to the invention. Any modifications, equivalent replacements, improvements and the like within the spirit and principle of the invention shall be contained within the scope of protection of the claims of the invention.

What is claimed is:

1. A method for processing a video image, comprising:
receiving an original video image;
adjusting a signal clock frequency of the original video image to acquire a processed video image;
after a command signal input by a user is received, capturing the processed video image according to a preset size to acquire a video image corresponding to a display window of the preset size; and
encoding the video image corresponding to the display window of the preset size to acquire an encoded video image,
wherein the command signal comprises a preset abscissa and a preset ordinate, wherein after the command signal input by the user is received, the step of capturing the processed video image according to the preset size to acquire the video image corresponding to the display window of the preset size comprises:
performing a pixel point computation according to a first formula to acquire the maximum number Ho of horizontal pixel points of the display window of the preset size, wherein the first formula is:

$$Ho = \frac{Po}{Pi} \times Hit - Hos,$$

wherein the Po is a fixed pixel clock frequency, the Pi is a pixel clock frequency of the original video image, the Hit is the total number of line cycle clocks of the original video image, and the Hos is a spacing of effective pixels between two lines of an output video;
capturing the horizontal pixel points with the maximum number of the display window of the preset size according to the preset abscissa to acquire horizontal pixel points of the display window of the preset size;
adopting vertical longitudinal points of a resolution of the original video image as vertical longitudinal pixel points of the display window of the preset size; and
capturing the processed video image according to the horizontal pixel points and the vertical longitudinal pixel point of the display window of the preset size to acquire the video image corresponding to the display window of the preset size.

2. The method according to claim 1, wherein the step of adjusting the signal clock frequency of the original video image to acquire the processed video image comprises:
extracting an original line signal, an original field signal, an original blanking signal and an original blanking masking signal from a control signal of the original video image;
performing reset count for the original field signal at jump points of the original field signal by taking the original line signal as a clock to acquire a field synchronization signal;
performing reset count for the original line signal at jump points of the original line signal by taking a fixed pixel clock frequency as a clock to acquire a line synchronization signal;
performing reset count for the original blanking signal at jump points which are moments greater than a synchronization head of the line synchronization signal by taking the line synchronization signal as a clock to acquire a blanking synchronization signal;
performing reset count for the original blanking masking signal at jump points of the blanking synchronization signal by taking the blanking synchronization signal as a clock to acquire a blanking masking signal; and
generating a processed video control signal according to the field synchronization signal, the line synchronization signal, the blanking synchronization signal and the blanking masking signal, and acquiring the processed video image.

3. The method according to claim 1, wherein, after receiving the original video image, the method further comprises:
receiving the command signal input by the user and parsing the command signal to acquire the preset abscissa and the preset ordinate.

4. The method according to claim 1, wherein, before adjusting the signal clock frequency of the original video image to acquire the processed video image, the method further comprises:
detecting whether a data signal of the original video image is a DDR signal; and
in a case where the data signal of the original video image is the DDR signal, adjusting a bit width of the data signal of the original video image to acquire an original video image of a clock single-edge transmission mode.

5. The method according to claim 1, wherein, after adjusting the signal clock frequency of the original video image to acquire the processed video image, the method further comprises:
performing a Ping-Pong access operation for the processed video image by taking the clock frequency of the original video image as a storing clock and taking a blanking signal of the processed video image as a storing enable signal.

6. A device for processing a video image, comprising:
a receiving module receiving an original video image;
a first processing module adjusting a signal clock frequency of the original video image to acquire a processed video image;
a second processing module, after a command signal input by a user is received, capturing the processed video image according to a preset size to acquire a video image corresponding to a display window of the preset size; and
an encoding module encoding the video image corresponding to the display window of the preset size to acquire an encoded video image,
wherein the command signal comprises a preset abscissa and a preset ordinate, wherein the second processing module comprises:
a first computation module, performing pixel point computation according to a first formula to acquire the maximum number Ho of horizontal pixel points of the display window of the preset size, wherein the first formula is:

$$Ho = \frac{Po}{Pi} \times Hit - Hos,$$

where the Po is a fixed pixel clock frequency, the Pi is a pixel clock frequency of the original video image, the Hit is the total number of line cycle clocks of the original video image, and the Hos is a spacing of effective pixels between two lines of an output video;
a first sub-processing module, capturing the horizontal pixel points with the maximum number of the display window of the preset size according to the preset abscissa to acquire horizontal pixel points of the display window of the preset size, and adopting vertical longitudinal points of a resolution of the original video image as vertical longitudinal pixel points of the display window of the preset size; and
a second sub-processing module, capturing the processed video image according to the horizontal pixel points and the vertical longitudinal pixel points of the display window of the preset size to acquire the video image corresponding to the display window of the preset size.

7. The device according to claim 6, wherein the first processing module comprises:
an extracting module extracting an original line signal, an original field signal, an original blanking signal and an original blanking masking signal from a control signal of the original video image;
a first counting module performing reset count for the original field signal at jump points of the original field signal by taking the original line signal as a clock to acquire a field synchronization signal;
a second counting module performing reset count for the original line signal at jump points of the original line signal by taking a fixed pixel clock frequency as a clock to acquire a line synchronization signal;
a third counting module performing reset count for the original blanking signal at jump points which are moments greater than a synchronization head of the line synchronization signal, by taking the line synchronization signal as a clock to acquire a blanking synchronization signal;
a fourth counting module performing reset count for the original blanking masking signal at jump points of the blanking synchronization signal by taking the blanking synchronization signal as a clock to acquire a blanking masking signal; and
a fourth sub-processing module generating a control signal of the processed video image according to the field synchronization signal, the line synchronization signal, the blanking synchronization signal and the blanking masking signal, and acquire the processed video image.

8. The device according to claim 6, wherein, after the receiving module receives the original video image, the device further comprises:
a third processing module receiving the command signal input by the user and parse the command signal to acquire the preset abscissa and the preset ordinate.

9. The device according to claim 6, wherein, before the first processing module adjusts the signal clock frequency of the original video image to acquire the processed video image, the device further comprises:
a detecting module detecting whether a data signal of the original video image is a DDR signal; and
a fourth processing module, in a case where the data signal of the original video image is the DDR signal, adjusting a bit width of the data signal of the original video image to acquire an original video image signal of a clock single-edge transmission mode.

10. The device according to claim 6, wherein, after the first processing module adjusts the signal clock frequency of the original video image to acquire the processed video image, the device further comprises:
a reading module performing a Ping-Pong access operation for the processed video image by taking the clock frequency of the original video image as a storing clock and taking the blanking signal of the processed video image as a storing enable signal.

\* \* \* \* \*